United States Patent [19]

Mavros et al.

[11] 4,312,645
[45] Jan. 26, 1982

[54] SEPARATOR ASSEMBLY

[75] Inventors: Stratos Mavros, Fort Lee; Dennis Wright, Waldwick, both of N.J.

[73] Assignee: Parmatic Filter Corporation, Wayne, N.J.

[21] Appl. No.: 128,505

[22] Filed: Mar. 10, 1980

[51] Int. Cl.³ .................. B01D 46/46; B01D 50/00
[52] U.S. Cl. ................................. 55/213; 55/328; 55/422; 55/493; 55/DIG. 25; 55/313
[58] Field of Search ............... 55/210, 213, 309, 313, 55/328, 422, 493, DIG. 25; 210/131

[56] References Cited

U.S. PATENT DOCUMENTS

| | | | |
|---|---|---|---|
| 1,666,756 | 4/1928 | Sass | 210/131 |
| 1,914,667 | 6/1933 | Kolla | 55/313 |
| 2,575,499 | 11/1951 | Manow | 55/422 |
| 3,411,272 | 11/1968 | Carmon | 55/328 |
| 3,869,266 | 3/1975 | Rannenberg | 55/DIG. 25 |
| 4,081,255 | 3/1978 | Evans | 55/309 |

FOREIGN PATENT DOCUMENTS

| | | | |
|---|---|---|---|
| 433056 | 6/1923 | Fed. Rep. of Germany | 55/313 |
| 875287 | 3/1953 | Fed. Rep. of Germany | 55/309 |

*Primary Examiner*—David L. Lacey
*Attorney, Agent, or Firm*—Lerner, David, Littenberg & Samuel

[57] ABSTRACT

A filtering assembly for an air intake duct for a turbine device for normally removing particulate matter entrained in the air being introduced to the turbine device through the air duct. The improved filtering assembly comprises a filter element for removing particulate matter entrained in air passing therethrough which is mounted in the air duct so that at least a section of the filter element is movable between a filtering position and bypass position. More particularly, the filter element is mounted in the air duct so that when it is in the filtering position, substantially all of the air passing through the air duct passes through the filter element and so that when it is in the bypass position, a substantial amount of the air passing through the air duct bypasses the filter. A suitable sensing device is provided for sensing the pressure differential of the air across the filter element in the air duct and a clamping device is provided which normally clamps the filter element in the filtering position. The clamping device is actuable to release the filter element from the filtering position to allow the filter element to move to the bypass position when the pressure differential sensed by the sensing device is above a predetermined pressure difference. In this manner, air flow will be maintained to the turbine, even if the filter becomes clogged or stopped, thereby preventing a situation in which the turbine might otherwise be starved of sufficient air flow.

8 Claims, 6 Drawing Figures

SEPARATOR ASSEMBLY

BACKGROUND OF THE INVENTION

The present invention relates to a separator assembly, and more particularly to a separator assembly for a gas turbine for marine applications. For example, the separator assembly of the present invention is particularly useful as a moisture and/or particle separator for removing moisture and/or particulate matter entrained in the air entering the air intake of a gas turbine of a ship.

Moisture separators are provided for gas turbines for marine applications as the moisture particles in the air generally contain salt which, if they should be introduced into the turbine, would deleteriously affect the component parts of the turbine, as for example, by chemical corrosion. Further, the dry particles entrained in the air, for example sand and/or salt crystals, can cause "pitting" of the turbine components if they are not removed. However, by far the greatest concern is the moisture particles containing salt.

Although various types of separator assemblies have been proposed for use in marine applications to minimize the passage of air containing such particles to the turbine, it will also be understood that of an even greater importance is the provision of a substantial air flow being maintained to the turbine. In fact, this is of such importance that it is deemed imperative that air always be delivered to the turbine, even if it means delivering air which might otherwise damage the turbine components, i.e. air having moisture and/or salt therein.

Accordingly, in the past, doors or passageways, known as "blow in" doors, have been provided in the air ducts adjacent the moisture separators which are automatically opened if the pressure drop across the moisture separator increases too much, i.e., beyond a predetermined limit which might otherwise result in the turbine being starved of air flow. In accordance with these prior art arrangements, unfiltered air is thus allowed to flow into the air duct, bypassing the moisture separator, to be delivered to the turbine.

Such an increase in the pressure drop, across the moisture separator can result from freezing or icing up of the moisture separators when the ships on which they are mounted are in cold or icy waters since the moisture separators for the gas turbines on such ships are generally located high up on the ship where they are unprotected from the elements. For example, the moisture that is removed from the air by the moisture separator can freeze in the moisture separator, thereby significantly blocking the flow of air through the separator which, in turn, causes the pressure drop across the moisture separator to increase, and a consequent decrease in the amount of air being delivered to the turbine.

Thus, in the prior art, if this should occur, the auxiliary "blow in" doors or passageways are caused to open automatically by detection or sensing of an increase in the pressure differential across the separator device.

As can be appreciated, such separate auxiliary doors require the manufacture of different components, as well as the provision of separate air passages into the air duct, thereby increasing the size and weight of the air ducts and separator assemblies for gas turbines on such ships. Still further, by having two separate passageways and two separate components in the separate passageways, the arrangement is quite complicated, bulky and cumbersome.

SUMMARY OF THE INVENTION

These and other disadvantages are overcome with the present invention in which there is provided a simplified separator assembly for the air intake duct of a turbine device which itself, or at least a section thereof, is movable in the air duct to allow air to bypass the separator and be directly introduced into the turbine. More particularly, in accordance with the present invention, the separator assembly comprises separating means for removing particulate matter entrained in the air passing therethrough, and mounting means for mounting the separating means in the air duct so that at least a section of the separating means is movable in the air duct between a separating position and a bypass position. The separating means, when the movable section is in the separating position, is arranged so that substantially all of the air passing through or into the air duct will pass through the separating means and, when the movable section is in the bypass position, is arranged so that air passing through the air duct bypasses at least the movable section of the separating means without passing therethrough. Sensing means are provided for sensing the pressure differential of the air across the separating means in the air duct. Further, means are provided responsive to sensing means for causing the movable section of the separating means to move to the bypass position when the pressure differential sensed by the sensing means is above a predetermined pressure difference. In this manner, the required air flow will be maintained to the turbine device.

More particularly, in accordance with the preferred embodiment of the present ivention, frame means are provided for supporting the separating means and the mounting means serves to mount the frame means for movement in the air duct between first and second positions corresponding to the separating and bypass positions of the separating means. That is, the mounting means preferably comprises pivot mounting means for pivotably mounting the frame means for movement between a first position in which separating means is arranged substantially normal to the air flow into the air duct, and a second position in which the separating means is inclined with respect to the nomal separating position so that air may flow around and bypass the separating means, and instead pass directly to the turbine. The pivot mounting means may comprise a pair of pin members mounted on the opposite side of the frame means in alignment with one another for providing pivotable movement about an axis passing through the pair of pin members, or may comprise hinge means along one edge of the frame means for hingedly supporting the frame means in the air duct for swinging type movement.

In each of these embodiments, suitable clamping means are provided for normally maintaining the frame means in the normal separating position and which are releasable in response to the pressure sensing means to allow the frame means to pivot or swing freely in response to the air flow being drawn into the air duct.

In a still further embodiment, the separating means comprises first and second separating stages, the second separating stage preferably being hingedly mounted to the first separating stage and movable relative thereto between a position in which it is arranged to tandem to the first separating stage and a bypass position in which it is inclined relative to the first separating stage. This arrangement is similar to the other arrangements noted above with the exception that the air passing through the air duct is still partially separated by the first separating stage.

These and further features and characteristics of the present invention will be apparent from the following detailed description in which references made to the enclosed drawings will illustrate the preferred embodiments of the present invention.

DETAILED DESCRIPTION OF THE PREFERRED EMBODIMENT

Figure 1:
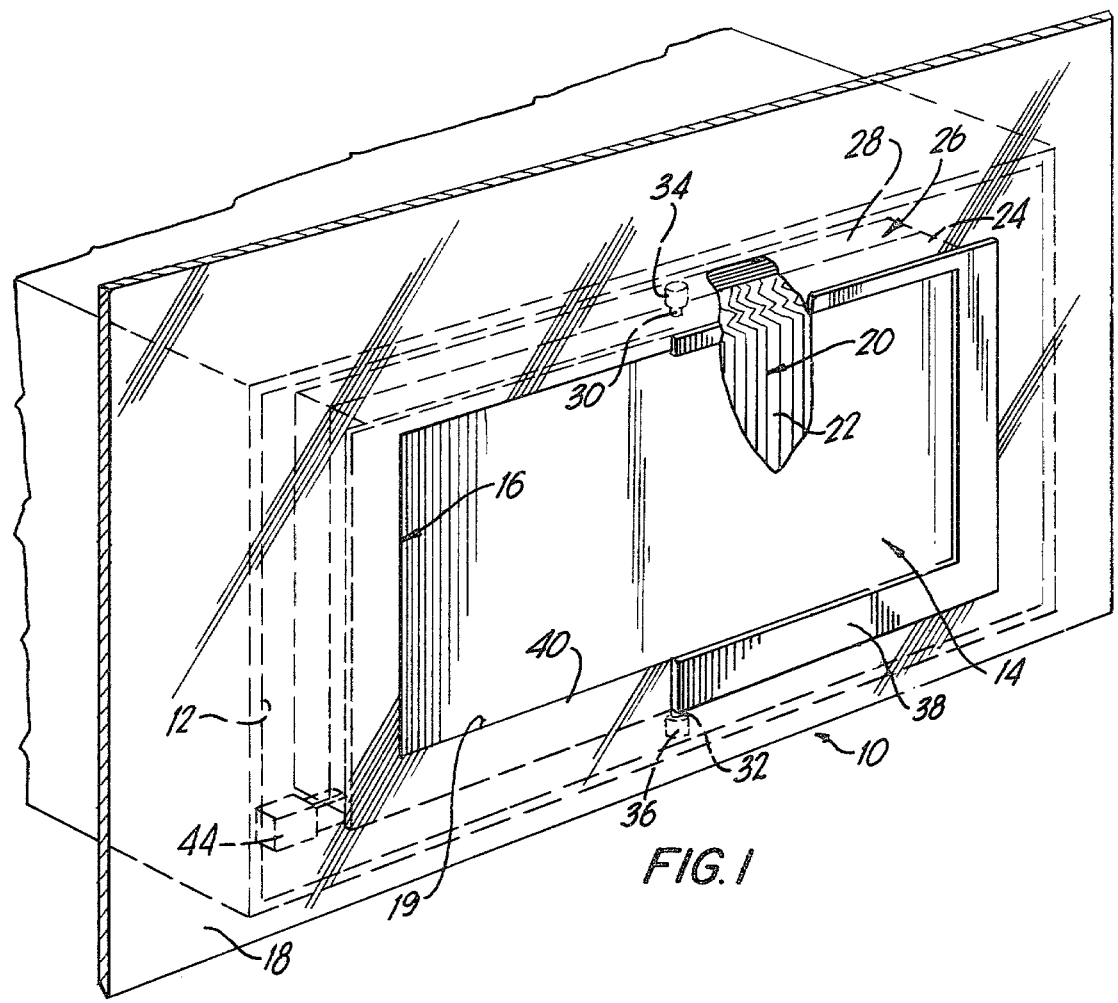
FIG. 1 is a perspective view, partially broken away, of a first embodiment of a separating assembly in accordance with the present invention, employed as a moisture separator for the air intake duct to a gas turbine on a ship, and being mounted in the entrance to such air intake duct.

Referring now to the drawings in which like reference characters represent like elements, there is shown in FIG. 1 a separator assembly 10 in accordance with the present invention for an air intake duct 12 for a turbine device (not shown). The turbine device, for example, may comprise a gas turbine, although it could be employed with respect to other types of turbines. Also, as the separator assembly 10 of the present invention is particularly usefl as a moisture separator for use with gas turbine on ships or other amphibious vehicles, it will be described with reference to such use. However, it should also be understood that the separator assembly 10 of the present invention could be used in any environment in which it is desirable to filter particles entrained in air being introduced to the turbine through the air intake duct 12 and in which it might also be necessary to allow unfiltered air to bypass the separating means thereof to prevent starvation of air to the turbine.

In gas turbines for marine applications, the turbines are operated to draw air into the air intake duct 12 across a moisture separator 14 to provide a desired amount of air to the turbine. Generally, the air ducts are placed high up in the ship or the vehicle so that as little moisture as possible might be entrained in the air being introduced into the gas turbine. In such instances, the moisture separator 14 is normally mounted at the inlet entrance 16 to the air duct 12.

The air flow to be introduced to the turbine in such marine applications, which typically is required to be on the order of magnitude of 2000 cubic feet per second or greater, is dependent upon the cross sectional area of the air intake duct 12 through which the air is introduced and the velocity of the flow of air therethrough. For example, if the flow velocity through the air intake duct 12 can be increased, the cross sectional area of the duct 12 (and thus the size of the duct 12) can be reduced substantially. On the other hand, the pressure drop across the moisture separator 14 placed in the air intake duct 12 must be maintained at an acceptable level, i.e. for example, less than 6 inches of water. As the pressure drop across the moisture separator 14 is dependent both on the flow resistance offered by the moisture separator 14 itself and also on the velocity of the flow therethrough, the pressure drop thus serves as a limit on the increase in flow velocity which can be obtained to satisfy the requirements for a given mass flow rate. Therefore, as it is desirable to decrease the size of the air duct 12 (to save on costs, weight, and size) it is desirable to design the moisture separator 14 so as to have as low a flow resistance as possible. At the same time, however, the reduction in flow resistance offered by the moisture separator 14 must not be such as to impair the efficiency to remove the moisture particles from the air passing through the moisture separator 14. For example, in many marine applications, high flow velocities through the moisture separators on the order of 20 feet per second and greater are desired.

These parameters as have been discussed hereinabove thus go into determining the precise design for any given type of moisture separator 14 for the air intake duct 12 of the turbine, as well as the size of the air intake duct 12 itself, so as to provide the required mass flow to the turbine, while at the same time maintaining the pressure drop across the moisture separator 14 at acceptable levels.

However, despite designs which are intended to place the moisture separators 14 in the air intake ducts 12 in an environment such that they will not clog or freeze up, i.e. placing them high up on the ship, the possibility still exists that the moisture separators 14 will clog during operation. As can be appreciated, such clogging increases the flow resistance presented by the moisture separator 14 for air flow into the air intake duct 12 of gas turbines. As the mass flow rate to the turbine is dependent on the resistance presented to the flow of air into the air intake duct 12, it can be appreciated that if the resistance presented by the moisture separator 14 increases, the amount of air flow delivered to the turbine will correspondingly decrease. As it is imperative that a sufficient amount of air always be delivered to the turbine, if the moisture separator 14 should clog or the resistance presented thereby increases beyond an acceptable limit, it is necessary to provide some means for bypassing the moisture separator 14 to deliver the required air flow to the turbine.

Accordingly, as discussed in The Background of the Invention section herein, "blow in" doors have been provided in that past which comprise separate doors or elements which automatically open if the pressure drop across the moisture separator 14 increases beyond a set limit. This thus allows unfiltered air to flow into the air duct 12, bypassing the moisture separator 14, to be delivered to the turbine.

In accordance with the present invention, the moisture separator 14 itself, or at least a section thereof, is movably mounted in the air duct 12 to provide this "blow in" feature for the separating assembly 10, thereby eliminating the need for separate "blow in" doors in flow communication with the air duct for bypassing the moisture separator 14.

Figure 2:
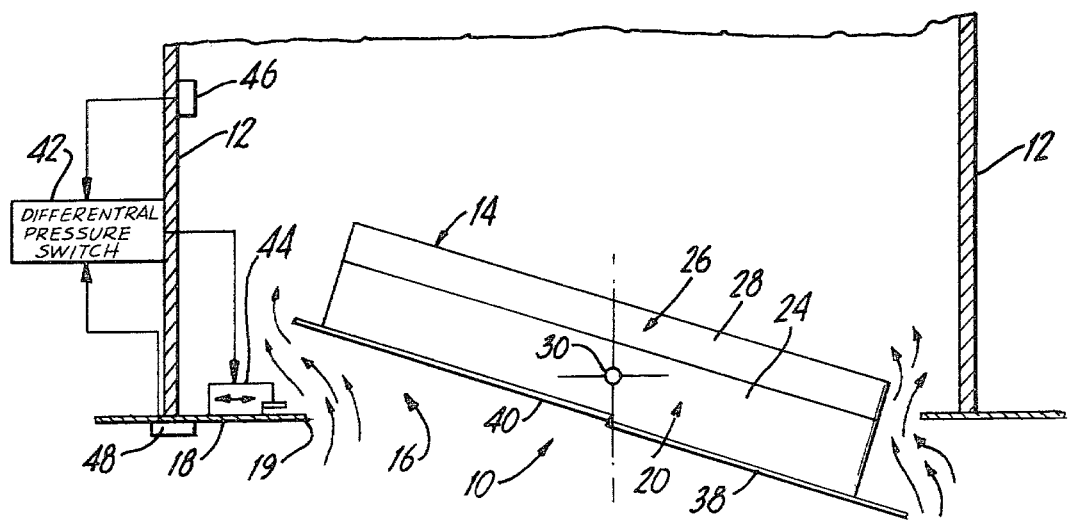
FIG. 2 is a top sectional view showing the moisture separator of FIG. 1 pivoted relative to the air duct to allow air to bypass the moisture separator, such as might be necessary if freezing or icing up of the separator occurs.

More particularly, in accordance with the general principles of the present invention, as for example seen in FIGS. 1 and 2, the separator assembly 10 is mounted at the entrance 16 to the air intake duct 12 to the gas turbine. The end 16 of the air intake duct 12 remote from the turbine preferably includes an entrance cover plate 18 attached thereto and having an opening 19 therethrough which defines the inlet entrance for air flow into the air duct 12. The moisture separator 14 is mounted in the air intake duct 12 adjacent the opening 19 in the cover plate 18 and is of a size corresponding to the size of the inlet opening 19 so that it may be positioned to encompass the inlet opening 19 whereby substantially all of the air drawn into the air intake duct 12 flows through the moisture separator 14. Further, the moisture separator 14 is mounted so that if the pressure drop thereacross increases beyond a predetermined value, the moisture separator 14 is operative to move or open away from the inlet opening 19 to allow air to pass therearound, thus bypassing the moisture separator 14 and instead passing directly to the gas turbine. In this manner, an improved separator assembly 10 is provided which is less cumbersome and bulky than the prior art arrangements and which will still maintain the air flow to the turbine under virtually all conditions.

In the embodiment shown in FIGS. 1 and 2, the moisture separator 14 comprises a two stage moisture separator arranged at the inlet end 16 of the air intake duct 12 to receive unfiltered air being drawn into the intake duct 12 to filter and process same to remove particulate matter, such as moisture and salt therefrom prior to conduction to the turbine. The first stage of the moisture separator 14 comprises a conventional inertia separating device 20 through which the air flow to be introduced to the turbine first passes to provide partially processed air. This inertia device 20, for example, may comprise a plurality of chevron or V-shaped vanes 22 vertically oriented and closely spaced relative to one another. However, it should, of course, be understood that other types of inertia devices could be used, as for example, cyclone separators. The plurality of vanes 22 are supported in a support frame member 24 which peripherally surrounds the vanes 22 and holds the upper and lower ends thereof in a fixed position.

As the air flows through the vanes 22, it must turn or bend several times to follow the path between the peaked sections of adjacent vanes 22. As the entrained particles, such as for example, moisture particles containing salt, sand or other particular matter are generally of a larger mass than the air particles, the entrained particles are thrown outwardly during the turns against the surfaces of the vanes 22 due to the centrifical force exerted thereon. That is, the lighter air particles are capable of making the turns through the series of peaked sections whereas the heavier mass particles are not, thereby resulting in the larger particles impacting on the surface of the vanes 22. Each of the peaks of the vanes 22 may include stops for preventing the impacted particles from sliding along the surface of the vanes 22 and becoming reentrained by virtue of the aerodynamic drag force exerted by the air flow.

Such an arrangement is particularly useful for removing the heavier particles entrained in the air, since such particles are more likely to impact on the vanes and thus be removed from the air flow. On the other hand, lighter particles may have a tendency to successfully follow the flow path and remain entrained in the air. For example, such inertia separator devices 20 have been found to be efficient in removing moisture particles of a size over 8 microns (25.4 microns approximately equallying 0.001 inches) in the range of the high flow velocities with which moisture separators 14 for gas turbines are concerned, i.e., greater than 20 feet per second. However, the plurality of vanes 22 have not exhibited a high efficiency for removing moisture particles in the lower size droplet range, namely 8 microns and below. Thus, it may be desirable to utilize further separating stages or devices for removing such lower size particles.

In this regard, in the embodiment shown in FIGS. 1 and 2, after being partially processed by the first stage 20 of the moisture separator 14, the air is introduced through the second stage 26 which serves to further process the air to remove particles still entrained therein. For example, this second stage 26 of the moisture separator 14 may comprise one or more layers each comprising a plurality of fiber elements or wires. The layers of fiber elements are housed within a peripheral frame member 28 which is arranged in tandem to the first stage 20 in a suitable manner, such as for example by affixing the second stage frame member 28 to the downstream side of the first stage frame member 24. The second stage 26 is preferably designed to remove the smaller sized particles entrained in the air to provide fully processed air in which virtually all of the moisture particles and other particulate matter are removed therefrom.

Although in the preferred embodiments of the present invention described herein only two stage moisture separators 14 are provided, it should of course be realized that additional separating stages could be provided and mounted in tandem to the first two stages downstream thereof. The particular design of any moisture separator 14, of course, is dependent upon the particular circumstances and environment in which the moisture separator 14 will be placed, as well as the desired characteristics for the processed air. However, in accordance with the present invention, it should also be appreciated that it is preferable that the number of stages be kept at a minimum while, at the same time, maximizing the efficiency of removal of moisture particles, in order to minimize the size and weight of the moisture separator 14 in the air intake duct 12. In this regard, generally speaking, as the number of stages increase, the flow resistance increases, as does the weight of the device which, as mentioned above, is undesirable.

Further, in accordance with the embodiment shown in FIG. 1, the moisture separator 14 is rotatably supported in the air duct 12 so as to be vertically rotatable about an axis defined by means of vertically aligned pin members 30, 32 provided on the upper and lower surfaces of the first stage frame member 24. These pin members 30, 32 are each received in suitable sockets 34, 36 provided in the upper and lower inner surfaces of the air duct frame 12. In this manner, the moisture separator 14 may be arranged in a separating position in which it is normal to the direction of the air flow into the duct 12 (see FIG. 1) so that substantially all of the air being introduced into the air duct 12 must pass through the first and second separator stages 20, 26. The moisture separator 14 is also pivotable to a bypass position in which it is inclined to the direction of the air flow (see FIG. 2). When in this bypass position, as can best be seen in FIG. 2, air will be introduced into the air duct 12 around the outer peripheral edges of the first and second stage frame members 24, 28 of the moisture separator 14, thus completely bypassing the moisture separator 14.

It will be appreciated that in this embodiment shown in FIGS. 1 and 2, the first stage frame member 24 is constructed at its forward or upstream end to have an outer flanged portion 38 on one side of the pin members 30, 32 (the right hand side in FIGS. 1 and 2) and an inner flanged portion 40 on the other side of the pin members 30, 32 (the left hand side of FIGS. 1 and 2) so that the moisture separator 14 is freely pivotable in a clockwise direction as viewed in FIG. 2 from separating position to the bypass position. In separating position, these flanged portions 38, 40 serve to seal the inlet opening 19 to the air duct 12.

Thus, during normal operation on the ship, all of the air flow into the air intake duct 12 for the turbine must pass through the moisture separator 14. This is the FIG. 1 position. However, should icing occur, or, should the moisture separator 14 become clogged, covered, etc. (virtually anything which would increase the flow resistance significantly presented by the moisture separator 14), the pressure drop across the separator 14 will increase. This pressure drop across the separator 14 may be sensed with appropriate means, such as, for example, pressure sensors 46, 48 and a differential pressure sensor or switch 42. If a high limit is reached, a suitable locking or clamping device 44 will automatically be actuated to release the separator 14 from its separating position (see FIG. 2).

More particularly, this pressure sensing means may comprise conventional components which have been used in the past for sensing the pressure differential across the moisture separator 14 and for operating the conventional "blow in" doors. For example, the pressure sensing means may comprise a pair of pressure sensors or tubes 46, 48, one of which is located internally in the air duct 12 and the other of which is located externally of the air duct 12, i.e., subject to atmospheric pressure. A suitable differential pressure switch 42 receives the outputs from each of the pressure sensors 46, 48 and determines the differential pressure for the air flow across the moisture separator 14 being introduced into the air intake duct 12. The differential pressure switch 42 is appropriately connected to the locking or clamping device 44 which normally holds the moisture separator 14 in the separating position such that, if a high limit on the pressure drop is reached, such as for example, greater than 6 inches of water, the clamping device 44 will be automatically actuated to release the clamping or locking force for holding the moisture separator 14 in the separating position.

In the embodiment shown in FIGS. 1 and 2, this clamping device 44 comprises a two position clamping device which is mounted to the inner surface of the air intake cover plate 18, and is movable between first and second positions. This movement can be caused by either electrical, pneumatic or hydraulic means. In the first position, the clamping device 44 is adapted to engage the inner flanged portion 40 of the first stage frame member 24 to lock it in a position in which the moisture separator 14 covers the entire inlet opening 19 into the air duct 12 so that all air flow must pass through the moisture separator 14 into the air intake duct 12. This clamping device 44 is movable to a second position in response to the differential pressure switch 42 sensing a high limit on the pressure drop to release the holding force on the moisture separator 14. Because of the increased pressure differential across the moisture separator 14, the moisture separator 14 will thus swing on the pins 30, 32, thereby allowing the air to flow into the duct 12 around the sides of the moisture separator 14, as shown in FIG. 2.

In this regard, it will be appreciated that the pins 30, 32 are slightly offset relative to the vertical center line of the first stage frame member 24 so that the action of the pressure difference experienced by the moisture separator 14 between the exterior of the air duct 12 and the interior of the air duct 12 will cause the element 14 to swing about the pins 30, 32. This action of swinging open will thus insure that sufficient air will always be delivered to the gas turbine.

To prevent the moisture separator 14 itself from becoming frozen in the opening 19 of the air duct 12, suitable heaters (not shown) may be provided around the perimeter of the opening 19 to prevent freezing, as is conventional with respect to the separate conventional "blow in" doors of the prior art.

Figure 3:
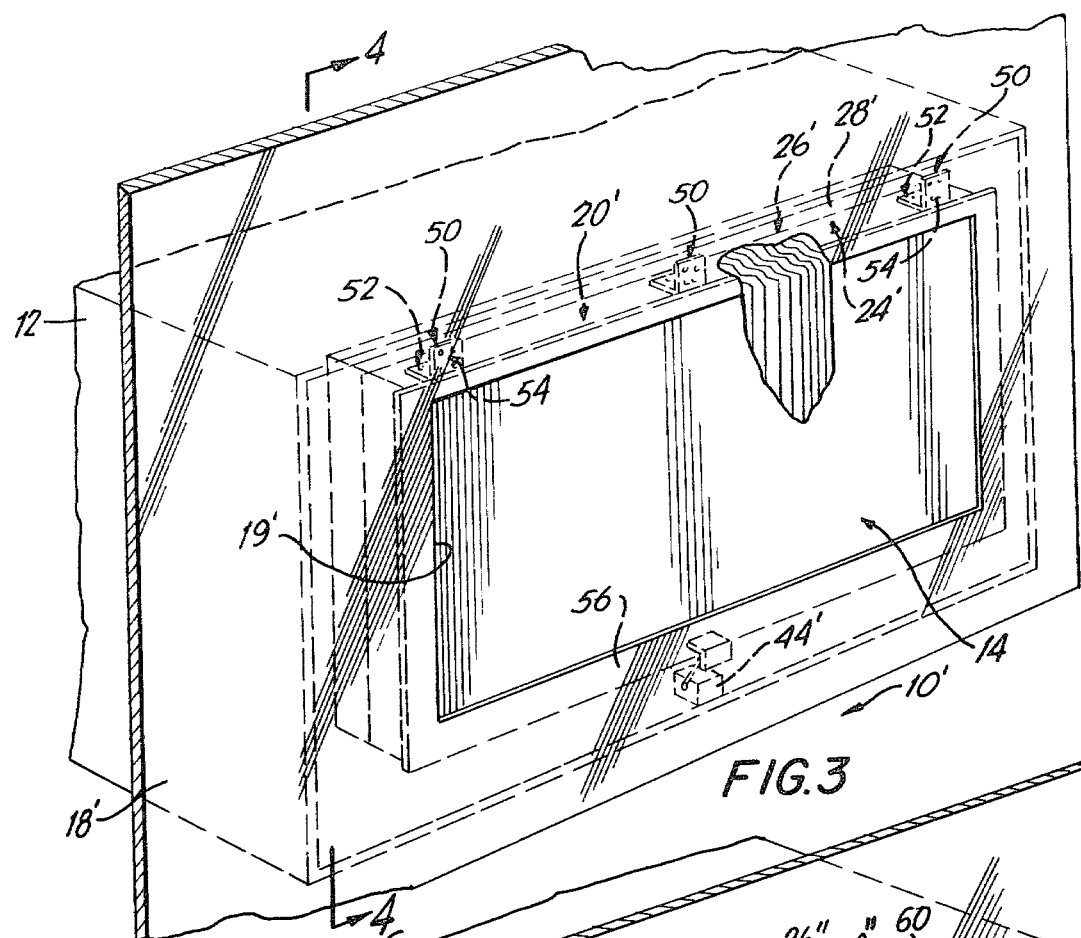
FIG. 3 is a perspective view, partially in section, of an alternative embodiment of the separating assembly in accordance with the present invention, which may also be employed as a moisture separator for the air intake duct to a gas turbine in a ship and which is operative to allow air passing in the air duct to bypass the moisture separator.
Figure 4:
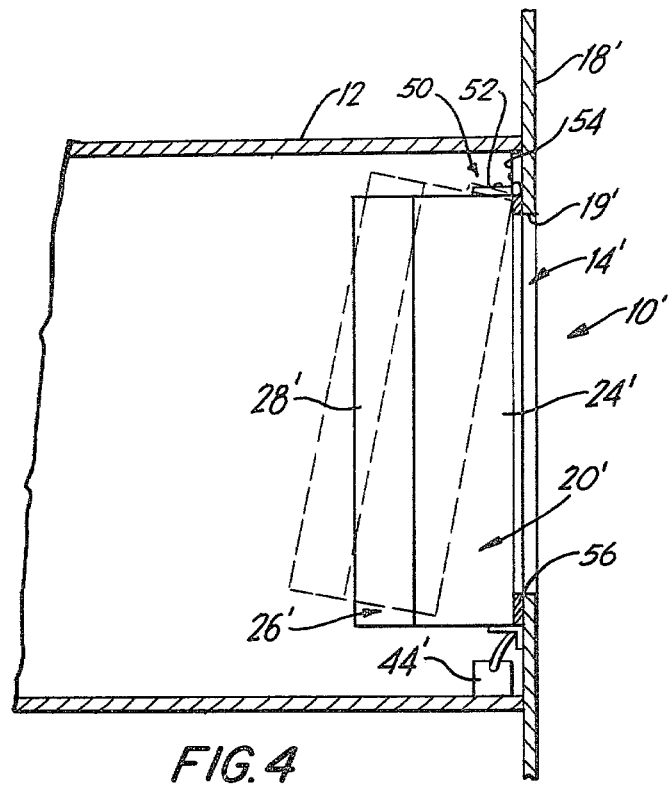
FIG. 4 is a sectional view of the separating assembly taken along line 4—4 of FIG. 3.

The embodiment of the present invention as shown in FIGS. 3 and 4 is directed to an alternative arrangement for the separator assembly 10' which is also operative to move the moisture separator 14' thereof to a position to allow the air being introduced into the air duct 12 to completely bypass the moisture separator 14'. Again, in this embodiment, the moisture separator comprises a two stage moisture separator in which both the first and second stages 20', 26° are fixedly arranged in tandem. The two joined stages 20', 26' are together hingedly supported in the air intake duct 12 so that the entire moisture separator 14' is swingable about a horizontal axis extending along the upper surface or edge of the moisture separator 14' to allow the moisture separator 14' to be pivoted backwardly and upwardly to allow air flow to flow around the bottom and side edges thereof into the air intake duct 12. More particularly, a plurality of hinges 50 are provided with one plate 52 of each hinge 50 being secured to the frame member 24' of the first stage 20' of the moisture separator 14' and with the other plate 54 of each hinge 50 being secured to the inner surface of the intake cover plate 18' adjacent to upper edge of the opening 19'. Alternatively, a single continuous hinge could be provided which extends across the width of the moisture separator 14'.

In this regard, the forward or upstream end of the first stage frame member 24' has a sealing flanged portion 56 about the periphery thereof which is adapted to seal against the inner surface of the air intake cover plate 18' around the inlet opening 19' thereof. The moisture separator 14' is normally maintained in coextensive relationship with respect to the air intake opening 19' so that substantially all of the air flow must pass through the moisture separator 14' into the air intake duct 12. The moisture separator 14' is maintained in this position by a suitable locking or clamping device 44' which may, for example, comprise a pivotable clamping element which engages and clamps the flanged member 56 on the bottom of the first stage frame member 24' against the air intake cover plate 18'. The clamping device 44' is suitably actuable to move, for example by pivoting backwards, out of engagement with the flanged member 56 of the moisture separator 14' so that the introduction of air flow into the air intake duct 12 will cause the entire element 14' to pivot backwardly and upwardly to allow air to pass around the bottom and lower side edges thereof. Again, as in the FIG. 1 and 2 embodiment, the clamping devices 44' of the FIG. 3 and 4 embodiment is actuable in response to a predetermined upper limit pressure differential being sensed by a differential pressure switch to move the clamping device 44' to the unlocking position. In the FIG. 3 and 4 embodiment, this differential pressure switch and the sensors therefor are not specifically shown, but may be of a conventional type, as with the embodiment shown in FIGS. 1 and 2.

Figure 5:
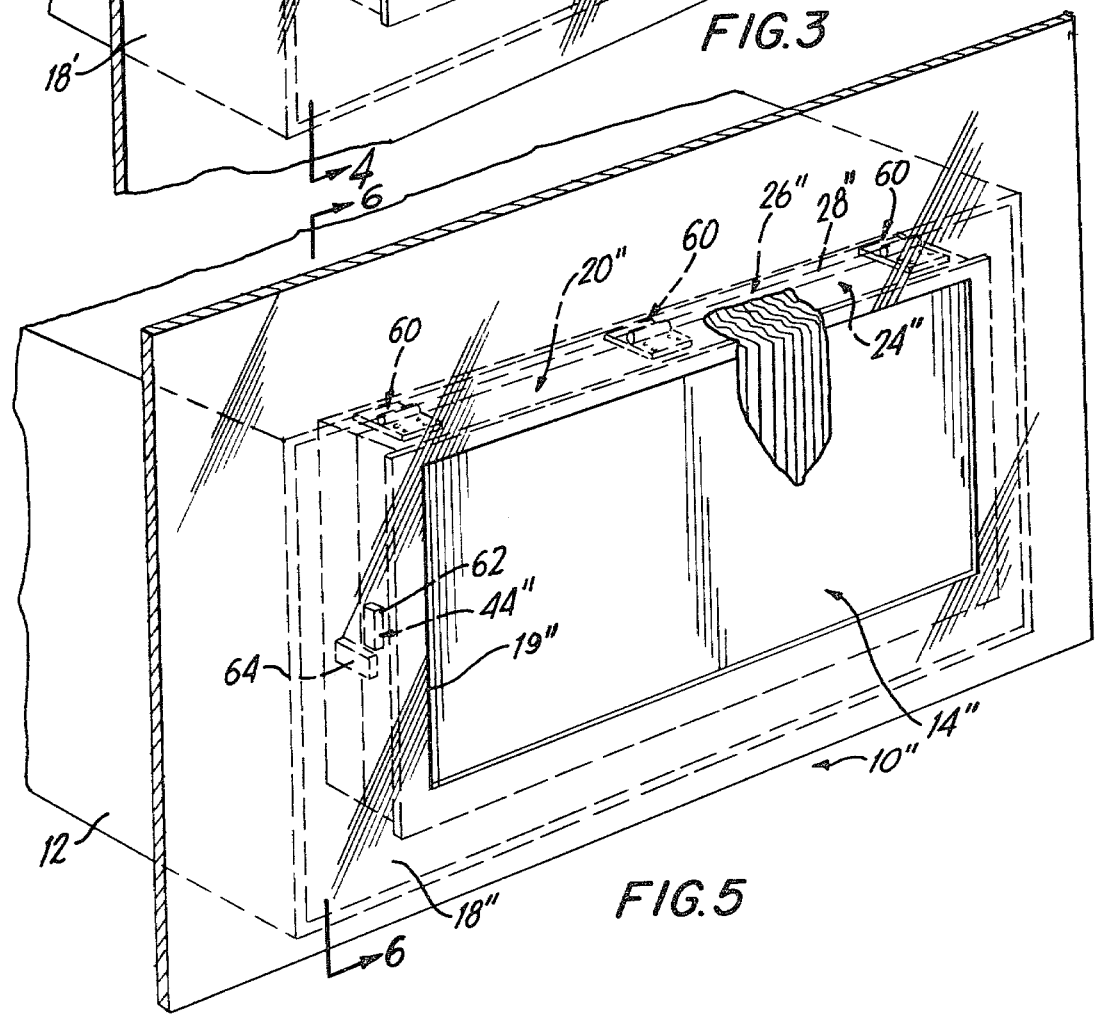
FIG. 5 is a perspective view of a still further alternative embodiment in accordance with the present invention in which there is provided a two stage separator assembly in which only the second stage is movable to a position to allow air to bypass the second stage.
Figure 6:
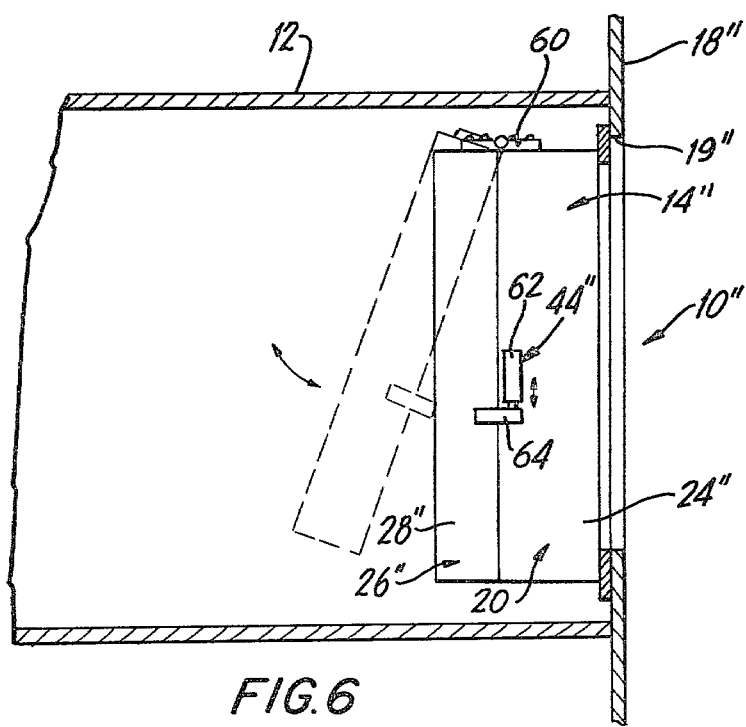
FIG. 6 is a sectional view of the separator assembly of FIG. 5 taken along lines 6—6 of FIG. 5.

FIGS. 5 and 6 show a third alternative embodiment for a separator assembly 10" which is operative so that the air flow into the air intake duct 12, even during an icing up situation, still is partially filtered. In this embodiment, the moisture separator 14" again comprises a two stage moisture separator 14" in which both of the stages 20", 26" are normally arranged in tandem. However, in this embodiment, the second stage frame member 28" is hingedly supported from the first stage frame member 24" by means of hinged member 60 so that the second stage 26" is pivotable relative to the first stage 20". The first stage frame member 24" is, in turn, fixedly supported in the air duct 12 adjacent the air intake cover plate 18" to substantially encompass the inlet opening 19" thereof. A suitable clamp or locking device 44" is provided to normally maintain the first and second stages 20", 26" adjacent to one another in a substantially normal plane to the air flow passing into the air intake duct 12. This clamping arrangement 44" may, for example, comprise a slideable pin member 62 which is movable to a locking position so that the end of the pin member 62 is received in a suitable recess provided in a block 64 secured to the second stage frame member 28" (see FIG. 6).

If the pressure differential across the moisture separator 14" exceeds the predetermined limit, as sensed by a suitable differential pressure switch and sensors (not shown), the clamping device 44" is simply actuated to release the holding or clamping force on the second stage 26" relative to the first stage 20". When this occurs, the introduction of the air flowing into the air intake duct 12 will cause the second stage 26" to pivot upwardly about the hinged members 60 away from the first stage 20" so that air will only flow through the first stage 20" and then around the lower bottom and side edges of the second stage 26".

It should be appreciated that in each of the different embodiments shown in FIGS. 1-6, as soon as the pressure differential switch 42 detects the differential pressure across the moisture separator 14 being above a predetermined limit, the clamping means 44 is released. Because of the resistance to air flow across the moisture separator 14, forces are created thereon to pivot or swing the moisture separator 14 or section thereof away from the separating position (in which it is substantially normal to the air flow) so that air being introduced into the air intake duct 12 for introduction to the turbine device may bypass at least the section of the moisture separator which is moved. In this regard, since the resistance to air flow through the moved moisture separator 14 (or moved section thereof) is substantially greater than the resistance to air flow around the moved moisture separator 14 (or the moved section thereof) when same has been pivoted or moved to the bypass position, substantially all of the air flow will pass around the moved section of the moisture separator and will not pass therethrough. Thus, substantially all of the air flow, or a great percentage thereof, will bypass the section of the moisture separator 14 which has been moved. While this may be disadvantageous from a viewpoint of separating particulate matter from the air, as the requirement for the delivery of air, even unfiltered air, to the turbine is of much more importance in terms of preventing significant damage to the turbine, the separator assembly 10 of the present invention desirably insures that air flow will be maintained to the turbine device under virtually all conditions.

Thus, it will be appreciated that in accordance with the present invention, the moisture separator 14 itself comprises a "blow in" door as well as a separator element for filtering of the air during normal operation. As can be appreciated this reduces the number of components required to be manufactured and maintained, and in particular results in the elimination of a separate "blow in" door or entranceway required by the prior art, thus minimizing manufacturing costs, weight, size, etc.

Also, while in the preferred embodiments described hereinabove, the movement of the separator element 14 (or section thereof) to the bypass position is simply caused as a result of release of the clamping device 44 so that the air flow itself causes the pivoting or swinging movement of the separator element 14, it should also be appreciated that a positive moving or assist means could also be provided for positively moving the filtering element 14 to the bypass position. For example, suitable hydraulic pistons could be attached to the inner walls of the air duct 12 and to the separator element 14 so that, when the pressure differential across the separator element 14 exceeds a predetermined limit, the positive moving or assist means is actuated to positively move the separator element 14 to the bypass position. In either event, that is either with any of the embodiments shown in the drawings or with an embodiment incorporating a positive moving or assist means, it will be appreciated that it is the separator element itself which moves to the bypass position, as opposed to separate doors or entranceways into the air intake duct being opened, as was the case in the prior art.

Accordingly, it will be appreciated that in accordance with the present invention there is provided a separator assembly 10 for an air intake duct 12 of a turbine device for normally removing partriculate matter entrained in the air being introduced to the turbine device. The separator assembly 10 includes separating means 14 for removing particulate matter entrained in the air passing therethrough, and mounting means 30, 32 (or 50, or 60) for mounting the separating means 14 in the air duct 12 so that at least a section of the separating means 14 is movable in the air duct 12 between a separating position and a bypass position. The separating means 14, when the section is in its separating position, is arranged so that substantially all of the air passing through the air duct 12 passes through the separating means 14. The separating means 14, when the section is in the bypass position, is arranged so that air passing into the air duct bypasses at least the section of the separating means 14 which has been moved. Sensing means are provided for sensing the pressure differential across the separating means 14 in the air duct 12 and means 44 responsive to the sensing means are provided for causing the movable section of the separating means 14 to move to the bypass position when the pressure differential sensed by the sensing means is above a predetermined pressure difference. In this manner, air flow will be maintained to the turbine device under virtually all conditions.

While the preferred embodiments of the present invention have been shown and described, it will be understood that such are merely illustrative and that changes may be made without departing from the scope of the invention as claimed.

What is claimed is:

1. A separator assembly for an air intake duct of a turbine device for normally removing particulate matter entrained in air being introduced into said turbine device, said air being introduced to flow through said air duct in a first direction, said separtator assembly comprising:

separating means for removing particulate matter entrained in air passing therethrough;

frame means for supporting said separating means;

pivotal mounting means for pivotably mounting said frame means in said air duct so as to pivot about an axis extending in a second direction which is transverse to said first direction, and so that said frame means when mounted in said air duct is pivotably movable between a first position in which said separating means is arranged in said air duct so that substantially all of the air passing through said air duct passes through said separating means, and a second position in which said separating means is arranged so that air passing through said air duct bypasses said separating means;

sensing means for sensing the pressure differential of the air across said separating means; and clamping means for normally clamping said frame means in said first position when said frame means is mounted in said air duct, said clamping means being operatively connected to said sensing means so that said clamping means is responsive to said sensing means sensing a pressure differential greater than a predetermined pressure difference to release said frame means from said first position so that the air flowing into said air duct causes said frame means to pivot about said axis toward said second position, whereby air flow will be maintained to the turbine device.

2. The separator assembly of claim 1 wherein said pivotal mounting means mounts said frame means so that when said frame means is in said first position said separting means is arranged to be substantially normal to said first direction at the location of said separating means, and so that when said frame means is in said second position said separating means is inclined with respect to the position of said separating means when said frame means is in said first position.

3. The separator assembly of claim 2 wherein said frame means has a peripheral outer portion surrounding said separating means and wherein said pivotal mounting means is adapted to mount said frame means adjacent an inlet opening of said duct so that when said frame means is in said first position, the outer peripheral portion of said frame means substantially encloses said inlet opening of said air duct so that substantially all of the air being introduced into said air duct passes through said separating means, and so that when said frame means is in said second position, at least a part of said frame means is displaced from said inlet opening to allow air being introduced into said air duct to bypass said separating means.

4. The separator assembly of claim 3 wherein said pivot mounting means comprises a pair of pin means disposed on opposite sides of said frame means and in alignment with one another for mounting said frame means for pivotable movement about an axis extending between said pair of pin means.

5. The separator assembly of claim 3 wherein said pivotal mounting means comprises hinge means for supporting a section of said frame means in said air duct for pivotal movement about said hinge means.

6. The separator assembly of claim 1 wherein said separating means comprises first and second separating stages, wherein said frame means supports said first and second separating stages in tandem arrangement to one another, and wherein said mounting means is adapted to mount said frame means so that said first and second separating stages are movable as a unit in said air duct.

7. A separator assembly for an air intake duct of a turbine device for normally removing particulate matter entrained in air being introduced into said turbine device, said air being introduced to flow through said air duct in a first direction, said separator assembly comprising:

a first separating stage for removing particulate matter entrained in air passing therethrough;

first stage mounting means for fixedly mounting said first separator stage in said air duct so that substantially all of the air passing through said air duct passes through said first separating stage;

a second separating stage for removing particulate matter entrained in air passing therethrough;

frame means for supporting said second separator stage;

second stage mounting means for pivotably mounting said frame means in said air duct so as to pivot about an axis extending in a second direction which is transverse to said first direction, and so that said frame means when mounted in said air duct is pivotably movable between a first position in which said second separating stage is arranged in said air duct so that substantially all of the air passing through said air duct passes through said second separating stage, and a second position in which said second separating stage is arranged so that air passing through said air duct bypasses said second separating stage;

sensing means for sensing the pressure differential of the air across at least one of said first and second separating stages; and clamping means for normally clamping said frame means in said first position when said frame means is mounted in said air duct, said clamping means being operatively connected to said sensing means so that said clamping means is responsive to said sensing means sensing a pressure differential greater than a predetermined pressure difference to release said frame means from said first position so that the air flowing through said air duct causes said frame means to pivot about said axis towards said second position, whereby air flow will be maintained to the turbine device.

8. The separator assembly of claim 7 wherein said second stage mounting means comprises hinge means for hingedly supporting said second separating stage on said first separating stage so that said first and second separating stages are arranged in tandem to one another when mounted in said air duct when said frame means is in said first position, and so that said second separating stage is inclined relative to said first separating stage when said frame means is in said second position to allow air passing through said first separating stage to bypass said second separating stage, and wherein said clamping means is actuable to release said second separating stage for movement relative to said first separating stage in response to said sensing means sensing a pressure differential above said predetermined pressure difference whereby the air flow through said air duct will pivot said second separating stage relative to said first separating stage to allow air to bypass said second separating stage.

* * * * *